United States Patent
Everitt et al.

(10) Patent No.: US 8,212,825 B1
(45) Date of Patent: Jul. 3, 2012

(54) SYSTEM AND METHOD FOR GEOMETRY SHADING

(75) Inventors: Cass W. Everitt, Round Rock, TX (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1069 days.

(21) Appl. No.: 11/945,995

(22) Filed: Nov. 27, 2007

(51) Int. Cl.
*G06F 15/80* (2006.01)
(52) U.S. Cl. ...................................................... 345/505
(58) Field of Classification Search .................. 345/426, 345/505
See application file for complete search history.

(56) References Cited

U.S. PATENT DOCUMENTS

| | | | | |
|---|---|---|---|---|
| 6,088,044 | A * | 7/2000 | Kwok et al. | 345/505 |
| 6,950,107 | B1 * | 9/2005 | Moreton et al. | 345/543 |
| 2004/0207630 | A1 * | 10/2004 | Moreton et al. | 345/543 |
| 2007/0182746 | A1 * | 8/2007 | Jiao et al. | 345/502 |
| 2007/0283356 | A1 * | 12/2007 | Du et al. | 718/102 |

OTHER PUBLICATIONS

ATI Radeon X800 Specification Sheet; http://web.archive.org/web/20060112011412/www.ati.com/products/radeonx800/specs.html, Oct. 12, 2006.*
Cube Map OpenGL Tutorial (http://developer.nvidia.com/object/cube_map_ogl_tutorial.html) Last updated: May 8, 2004.*
Ned Greene; "Environment Mapping and Other Applications of World Projections;" IEEE Proceedings of Graphics Interface 86, Nov. 1986, pp. 21-29.*

* cited by examiner

*Primary Examiner* — Edward Martello
(74) *Attorney, Agent, or Firm* — Patterson & Sheridan, LLP.

(57) ABSTRACT

One embodiment of the present invention sets forth a technique for more effectively utilizing graphics hardware by allowing the developer to exploit parallelism at the primitive-level. In this technique, an algorithm is analyzed to break the total work associated with processing one primitive into discrete portions of work. The results of this analysis are used to program a geometry shader group that includes multiple geometry shaders. Upon receiving a single input primitive, the geometry shader group launches multiple parallel threads, one thread in each geometry shader in the group corresponding to each discrete portion of work. As each thread completes, the output of the thread is stored in on-chip GPU memory for processing by the next stage in the graphics pipeline. Since the overall work associated with a given input primitive is distributed across multiple threads, the output of each thread is smaller and, thus, the total memory required to implement the algorithm is reduced.

20 Claims, 5 Drawing Sheets

SYSTEM AND METHOD FOR GEOMETRY SHADING

BACKGROUND OF THE INVENTION

1. Field of the Invention

The present invention relates generally to the field of graphics processing and more specifically to a system and method for geometry shading.

2. Description of the Related Art

A typical computing system includes a central processing unit (CPU), a system memory, a graphics processing unit (GPU), a GPU local memory, a GPU on-chip memory, one or more display devices, and one or more input devices. The CPU usually executes the overall structure of the software application and configures the GPU to perform specific tasks in the graphics pipeline (the collection of processing steps performed to transform 3-D images into 2-D images). Some GPUs are capable of very high performance using a relatively large number of small, parallel execution threads on dedicated programmable hardware processing units.

To fully realize the processing capabilities of advanced GPUs, GPU functionality may be exposed to graphics application developers through an application programming interface (API) of calls and libraries. Among other things, doing so enables graphics application developers to tailor their shading programs to optimize the way GPUs process graphics scenes and images. In some GPUs, the API may allow the hardware processing units to be configured as geometry shading engines that include multiple geometry shaders operating in parallel.

Typically, each geometry shader within a geometry shading engine is programmed to perform image-rendering operations on a single input primitive (group of vertices), such as a point, line, or triangle, to produce zero or more output primitives. Upon receiving an input primitive, each geometry shader launches one execution thread. Since multiple geometry shaders may be executing in parallel, the inputs and the outputs of the geometry shaders are stored in memory buffers to preserve the processing order of the primitives throughout the graphics pipeline. Typically, at least part of the geometry shader data buffers is stored in GPU on-chip memory. After all of the geometry shader threads across the different geometry shaders have completed, the output buffers of the geometry shaders are drained serially to transmit the geometry data to the next stage in the graphics pipeline.

For example, for use in cube-map rendering, a streaming multiprocessor that includes 32 streaming processors may be configured as a geometry shading engine that includes 32 parallel geometry shaders. If each of these geometry shaders receives an input triangle, then each of these geometry shaders executes one thread that processes the 6 cube faces and emits up to 6 output triangles, one for each face of the cube. In this case, the memory allocated to buffer the inputs of the geometry shaders must be able to store 96 vertices:

$$\left((32 \text{ geometry shaders}) * \left(1 \frac{\text{input triangle}}{\text{geometry shader}}\right) * \left(3 \frac{\text{vertices}}{\text{triangle}}\right)\right).$$

Similarly, the memory allocated to buffer the outputs of the geometry shaders must be able to store 576 vertices:

$$\left((32 \text{ geometry shaders}) * \left(6 \frac{\text{output triangles}}{\text{geometry shader}}\right) * \left(3 \frac{\text{vertices}}{\text{triangle}}\right)\right).$$

Furthermore, if it takes M cycles to process each cube face and store the resulting triangle in the output buffer, then the number of cycles for each geometry shader to fully execute its input triangle is:

$$\left((6 \text{ faces}) * \left(M \frac{\text{cycles}}{\text{face}}\right)\right).$$

cycles to fully execute its input triangle. And, before the geometry shaders may process the next 32 input primitives, the output buffers must be drained to the next stage in the pipeline. Therefore, the latency of the geometry shaders in this example is:

$$\left(\left((6 \text{ faces}) * \left(M \frac{\text{cycles}}{\text{face}}\right)\right) + (\text{time to drain output buffers})\right).$$

The functionality of programmable geometry shaders allows the GPU to implement shading programs that might otherwise be mapped to the CPU. One drawback to using geometry shaders, however, is that the memory required to store both the input primitives and the output primitives of the geometry shaders is expensive because the on-chip memories take up valuable die area. Another drawback is that the latency of the geometry shaders may be large. One way to reduce the cost of the memory is to use less expensive off-chip memory, such as the GPU local memory. However, since accessing off-chip memory is slower than accessing on-chip memory, such a solution will further increase the latency of the geometry shaders and, thus, may cause the geometry shaders to become a bottleneck in the graphics pipeline. Another approach to storing the primitives associated with the geometry shaders is to use a combination of on-chip memory and off-chip memory. Again, the on-chip memory will be expensive, and accessing the off-chip memory may cause the geometry shaders to become a bottleneck in the graphics pipeline.

As the foregoing illustrates, what is needed in the art is a more effective technique for parallel geometry shader processing.

SUMMARY OF THE INVENTION

One embodiment of the present invention sets forth a method for parallel geometry shading. The method includes the steps of defining a geometry shader group that includes a plurality of geometry shaders, where an execution thread that is an instance of a geometry shading program executes on each one of the geometry shaders, executing the geometry shading program such that the geometry shader group receives an input primitive, and transmitting an instance of the input primitive to each geometry shader in the geometry shader group for processing.

One advantage of the disclosed method is that, since the overall work associated with a given input primitive is distributed across multiple geometry shaders, the output of each geometry shader is smaller and, thus, the total memory required to implement the algorithm is reduced. Another advantage is that, since both the time required for the geometry shaders to execute and the time required to sequentially drain the resulting output buffers are reduced, the latency of the geometry shaders are also reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
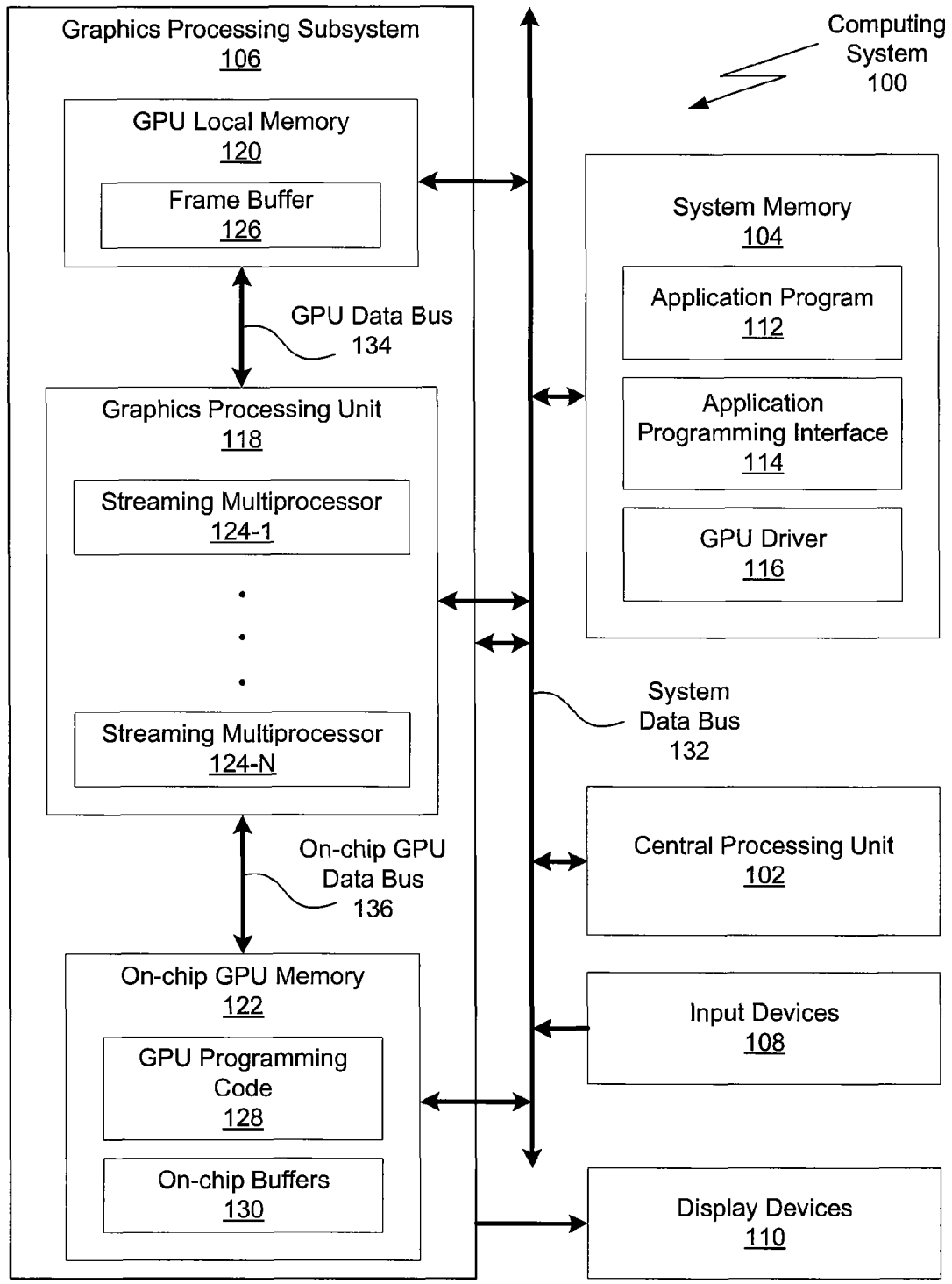
FIG. 1 is a conceptual diagram of a computing system in which one or more aspects of the invention may be implemented.

FIG. 1 is a conceptual diagram of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 110, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) used to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 110 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically used to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also used to store data and programming used by the GPU 118. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 118 can render to one two-dimensional surface while a second two-dimensional surface is used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Figure 2:
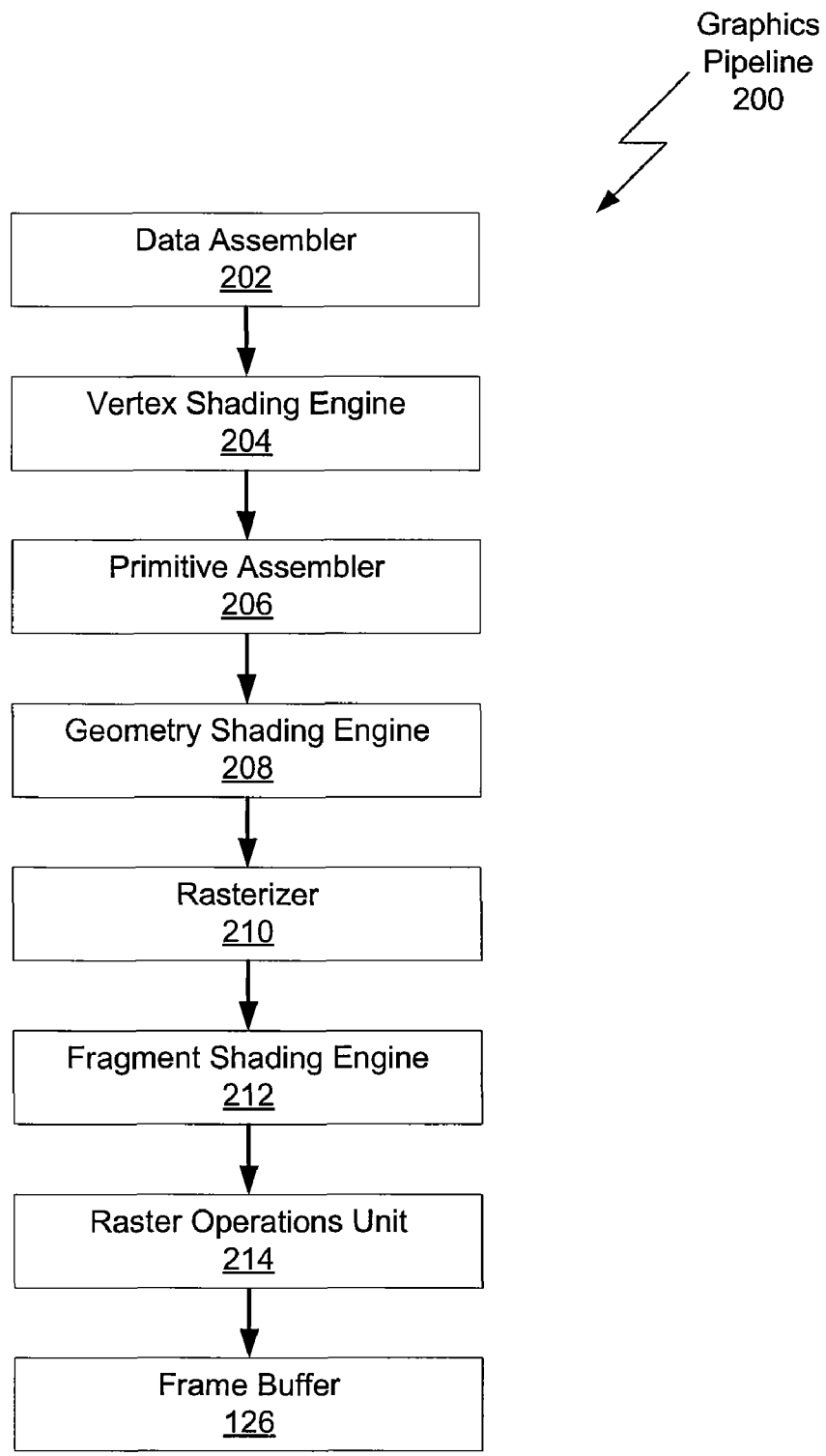
FIG. 2 is a conceptual diagram of a programmable graphics pipeline residing within the GPU of FIG. 1, according to one embodiment of the invention.

FIG. 2 is a conceptual diagram of a programmable graphics pipeline 200 residing within the GPU 118 of FIG. 1, according to one embodiment of the invention. The graphics pipeline 200 is configured to transform 3-D images into 2-D images. As shown, the graphics pipeline 200 includes a data assembler 202, a vertex shading engine 204, a primitive assembler 206, a geometry shading engine 208, a rasterizer 210, a fragment shading engine 212, a raster operations unit 214, and the frame buffer 126 of FIG. 1.

The data assembler 202 is a fixed-function unit that collects vertex data for high-order surfaces, primitives, and the like, and outputs the vertex data to the vertex shading engine 204. The data assembler 202 may gather data from buffers stored within system memory 104, the GPU local memory 120, and the on-chip GPU memory 122 as well as from API calls from the application program 112 used to specify vertex attributes. The vertex shading engine 204 is a programmable execution unit, such as the streaming multiprocessor 124-1, that is configured to execute a machine code vertex shading program, processing vertex data as specified by the vertex shading program. For example, vertex shading engine 204 may be programmed to transform the vertex data from an object-based coordinate representation (object space) to an alternatively based coordinate system such as world space or normalized device coordinates (NDC) space. The vertex processing unit 204 may read and write data that is stored in GPU local memory 120 and the on-chip GPU memory 122.

The primitive assembler 206 is a fixed-function unit that receives processed vertex data from vertex shading engine 204 and constructs graphics primitives, e.g., points, lines, triangles, or the like, for processing by the geometry shading engine 208. In alternative embodiments, a second primitive assembler (not shown) may be included subsequent to the geometry shading engine 208 in the data flow through the GPU 118. The geometry shading engine 208 is a programmable execution unit, such as the streaming multiprocessor 124-1, that is configured to execute a machine code geometry shading program, processing graphics primitives received from the primitive assembler 206 as specified by the geometry shading program. The geometry shading engine 208 may be programmed to generate zero or more new graphics primitives and calculate parameters, such as plane equation coefficients, that are used to rasterize the new graphics primitives. For example, for use in cube-map rendering, the geometry shading engine 208 may be configured to process input primitives, sextuple the input primitives, and emit up to 6 sets of output primitives, one for each face of a cube. The geometry shading engine 208 may read and write data that is stored in the GPU local memory 120 and the on-chip GPU memory 122. The geometry shading engine 208 outputs the parameters and new graphics primitives to the rasterizer 210. The rasterizer 210 is a fixed-function unit that scans the new graphics primitives and outputs fragments and coverage data to the fragment shading engine 212.

The fragment shading engine 212 is a programmable execution unit, such as the streaming multiprocessor 124-1, that is configured to execute a machine code fragment shading program, processing fragments received from rasterizer 210 as specified by the machine code fragment shading program. For example, the fragment shading engine 212 may be programmed to perform operations such as perspective correction, texture mapping, shading, blending, and the like, to produce shaded fragments that are output to the raster operations unit 214. The fragment shading engine 212 may read and write data that is stored in the GPU local memory 120 and the on-chip GPU memory 122. The raster operations unit 214 optionally performs fixed-function computations such as near and far plane clipping and raster operations, such as stencil, z test and the like, and outputs pixel data as processed graphics data for storage in a buffer in the GPU local memory 120, such as the frame buffer 126.

Figure 3:
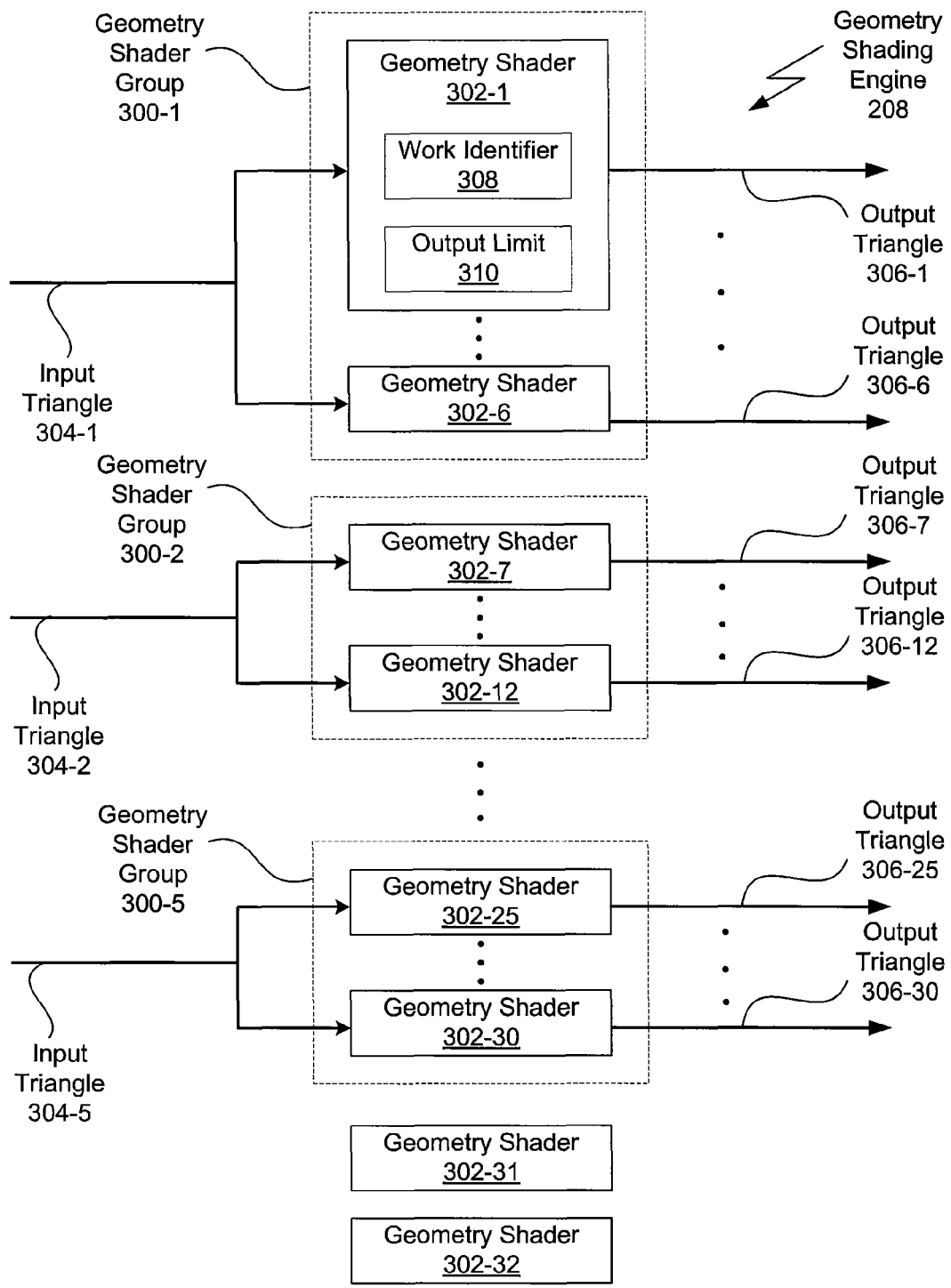
FIG. 3 is a conceptual diagram of the geometry shading engine in the graphics pipeline of FIG. 2, according to one embodiment of the invention.

FIG. 3 is a conceptual diagram of the geometry shading engine 208 in the graphics pipeline 200 of FIG. 2, according to one embodiment of the invention. As shown, the geometry shading engine 208 is a streaming multiprocessor 124 configured to perform geometry shading operations according to a geometry shading program. Each streaming processor in the streaming multiprocessor 124 is configured as an individual geometry shader 302, executing a single thread, which is an instance of the geometry shading program. In one embodiment, the streaming multiprocessor 124 includes 32 streaming processors, thereby providing the geometry shading engine 208 with 32 individual geometry shaders 302. In alternate embodiments, there may be more or fewer than 32 streaming processors and, thus, geometry shaders 302.

In prior art geometry shading engines, each input primitive is processed by a single geometry shader using a single thread. However, some geometry shading algorithms are amenable to partitioning the work associated with processing an input primitive into discrete portions of work that may be executed in parallel, across multiple threads. To efficiently execute a geometry shading program that is structured to expose this parallelism, the geometry shading engine 208 may be configured to include one or more geometry shader groups 300 executing in parallel. Each geometry shader group 300 includes two or more geometry shaders 302 operating in parallel to process the same input primitive, thereby processing the input primitive using multiple threads. As a result, each geometry shader 302 in a geometry shader group 300 performs a fraction of the work in a fraction of the time that would be required to process a single input primitive using a single geometry shader. Furthermore, as shown in detail for geometry shader 302-1, each geometry shader 302 within a particular geometry shader group 300 includes a work identifier 308, which is configured to specify the portion of work that each individual geometry shader 302 performs. In this fashion, the geometry shaders 302 in a particular geometry shader group 300 may be coordinated.

Distributing the work associated with processing an input primitive across multiple geometry shaders 302 in a geometry shader group 300 also distributes the emitted output primitives across the geometry shaders 302. By doing so, the number of input primitives processed simultaneously and the number of output primitives produced may be reduced. Since input primitives are stored in on-chip GPU memory 122 to allow parallel processing by the geometry shading engine 208, and output primitives are stored in on-chip GPU memory 122 to allow sequential processing by the rasterizer 210, distributing the work associated with processing an input primitive across a geometry shader group reduces the amount of data stored in on-chip GPU memory 122. More specifically, the amount of on-chip GPU memory 122 used by the geometry shading engine 208 tends to be inversely proportional to the number of geometry shaders 302 in each geometry shader group 300. Furthermore, as shown in detail for geometry shader 302-1, each geometry shader 302 is configured to include an output limit 310. The output limit 310 is a hardware-imposed upper limit on the number of output primitives that a single geometry shader may generate during each invocation.

FIG. 3 provides a specific illustration of the geometry shading engine 208 configured to perform geometry shading operations according to a geometry shading program for use in cube-map rendering. This geometry shading program logically subdivides the work associated with processing each input primitive into six discrete portions of work. The geometry shading engine 208 is configured to include five geometry shader groups 300, each of which includes six geometry shaders 302. The remaining two streaming processors in the streaming multiprocessor 124-1 are not used by the geometry shading engine 208 in such an implementation. As configured, the geometry shading engine 208 is able to concurrently process five input triangles 304. Each of the five input triangles 304 is processed by a corresponding geometry shader group 300. For example, the input triangle 304-1 is processed by the geometry shader group 300-1. In each geometry shader group 300, the work identifier 308 is used to configure each of the six geometry shaders 302 to generate an output triangle 306 for a different face of the cube. Since each geometry shader 302 generates only up to one output triangle 306, each geometry shader 302 produces only up to one-sixth of the data produced by each of the geometry shaders in prior art geometry shading approaches where each geometry shader produces all six output primitives for a given input primitive. In addition, each geometry shader 302 completes execution in one-sixth of the time required by the geometry shaders in prior art geometry shading approaches.

Figure 4:
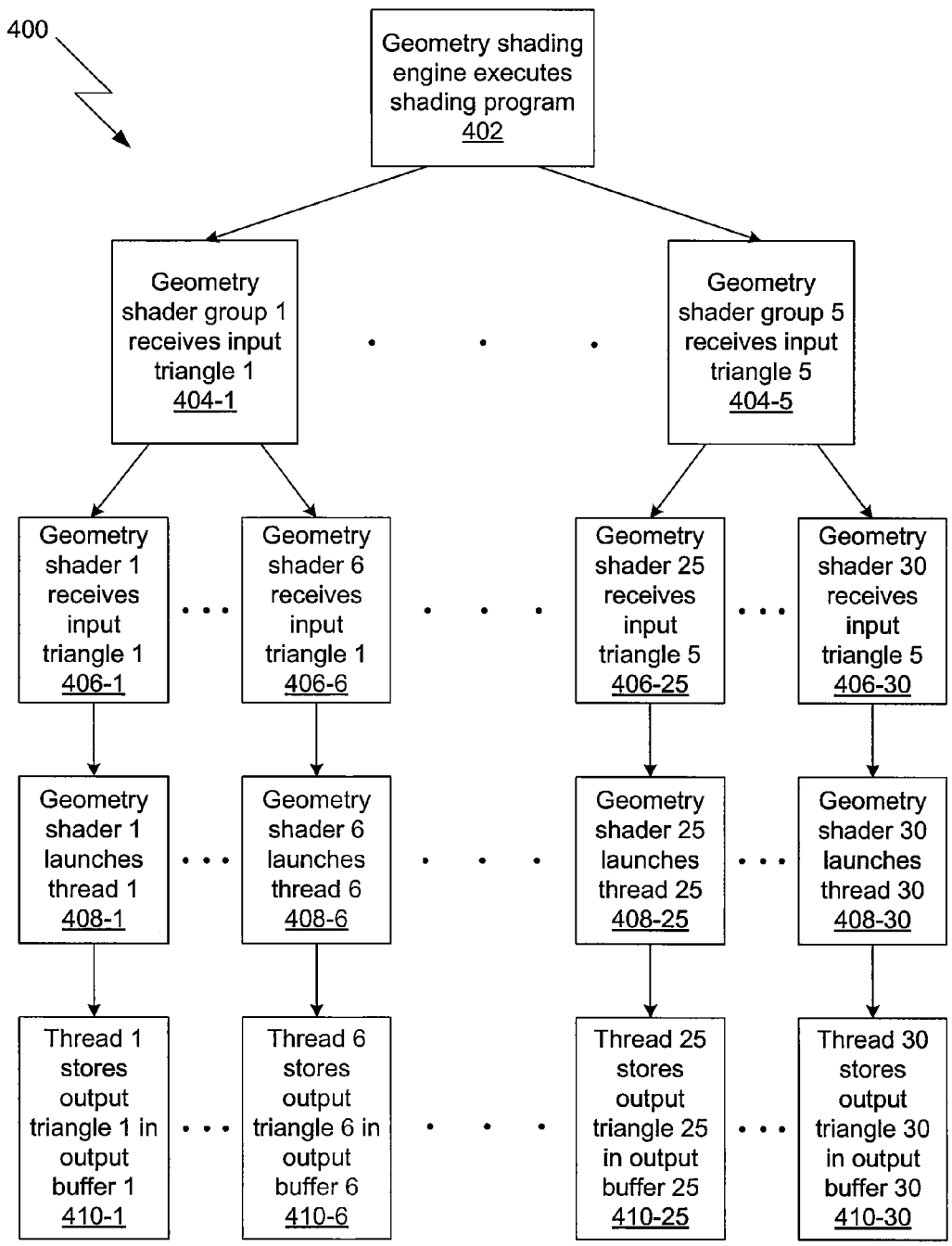
FIG. 4 is a flow diagram of method steps executed by the geometry shading engine of FIG. 3 when processing multiple input primitives for cube mapping, according to one embodiment of the invention.

FIG. 4 is a flow diagram of method steps executed by the geometry shading engine 208 of FIG. 3 when processing multiple input primitives for cube mapping, according to one embodiment of the invention. Although the method steps are described in conjunction with the systems of FIGS. 1-3, persons skilled in the art will understand that any system that performs the method steps, in any order, is within the scope of the invention.

As shown, the method 400 begins at step 402, where the geometry shading engine 208 executes a machine level geometry shading program designed to perform geometry shading operations associated with cube-map rendering. The geometry shading program configures the geometry shading engine 208 to concurrently process five input triangles 304 onto each of the six faces of a cube. Since each input triangle generates six output triangles (one output triangle for each face of the cube), a total of thirty output triangles 306 are generated. Furthermore, the geometry shading program configures the geometry shading engine 208 to distribute the work associated with processing each input triangle 304 into six distinct portions of work, one portion of work for each of the six output triangles generated for the input triangle 304.

To ensure that each of the five input triangles 304 are available to be processed in parallel in step 404, the five input triangles 304 are stored in the on-chip buffers 130 of FIG. 1. This requires the on-chip buffers 130 to allocate fifteen vertices of storage for the input triangles 304 used by the geometry shading engine 208:

$$\left( (5 \text{ geometry shader groups}) * \left(1 \frac{\text{input triangle}}{\text{geometry shader group}}\right) * \left(3 \frac{\text{vertices}}{\text{triangle}}\right)\right).$$

Advantageously, this amount of input storage is about one sixth of the input storage that is required for a conventional geometry shading engine that is configured to process 32 input triangles in parallel.

In step 404, each of the five geometry shader groups 300 within the geometry shading engine 208 concurrently receives an input triangle 304. Thus, the geometry shader group 300-1 receives the input triangle 304-1, the geometry shader group 300-2 receives the input triangle 304-2, the geometry shader group 300-3 receives the input triangle 304-3, the geometry shader group 300-4 receives the input triangle 304-4, and the geometry shader group 300-5 simultaneously receives the input triangle 304-5.

In step 406, logic within the geometry shading engine 208 causes the input triangle 304 associated with a particular geometry shader group 300 to be passed to each of the six geometry shaders 302 included in the geometry shader group 300. Thus, the geometry shaders 302-1 through 302-6 receive the input triangle 304-1, the geometry shaders 302-7 through 302-12 receive the input triangle 304-2, the geometry shaders 302-13 through 302-18 receive the input triangle 304-3, the geometry shaders 302-19 through 302-24 receive the input triangle 304-4, and the geometry shaders 302-25 through 302-30 receive the input triangle 304-5.

In step 408, each of the thirty geometry shaders 302 in the geometry shading engine 208 launches one thread that emits one output triangle 306. These thirty threads may execute in parallel. The work identifier 308 in each of the geometry shaders 302 may identify the face of the cube for which the geometry shader 302 generates an output triangle. For example, in one implementation, the work identifier 308 for the geometry shaders 302-1, 302-7, 302-13, 302-19, and 302-25 is one, indicating that each of these geometry shaders 302 may generate an output triangle 306 for face one of the cube.

Since, in step 408, each of the thirty geometry shaders 302 may execute in parallel, the thirty output triangles 306 may be stored in the on-chip buffers 130 to preserve the processing order of the output triangles 306 throughout the graphics pipeline. The on-chip buffers 130 allocate ninety vertices of storage for the thirty output triangles 306 generated by the geometry shading engine 208:

$$\left((30 \text{ geometry shaders}) * \left(1 \frac{\text{output triangle}}{\text{geometry shader}}\right) * \left(3 \frac{\text{vertices}}{\text{triangle}}\right)\right).$$

Advantageously, this amount of storage is about one sixth of the output storage that is required for a conventional geometry shading engine that is configured to process 32 input triangles, which results in 192 output triangles.

In step 410, each of the thirty parallel threads launched in step 408 concludes by storing the output triangle 306 generated by the thread in the on-chip buffers 130. The method 400 then terminates. Once the output triangles 306 generated by the geometry shading engine 208 have been passed to the rasterizer 210, the method 400 may repeat with another set of five input triangles 304.

Figure 5:
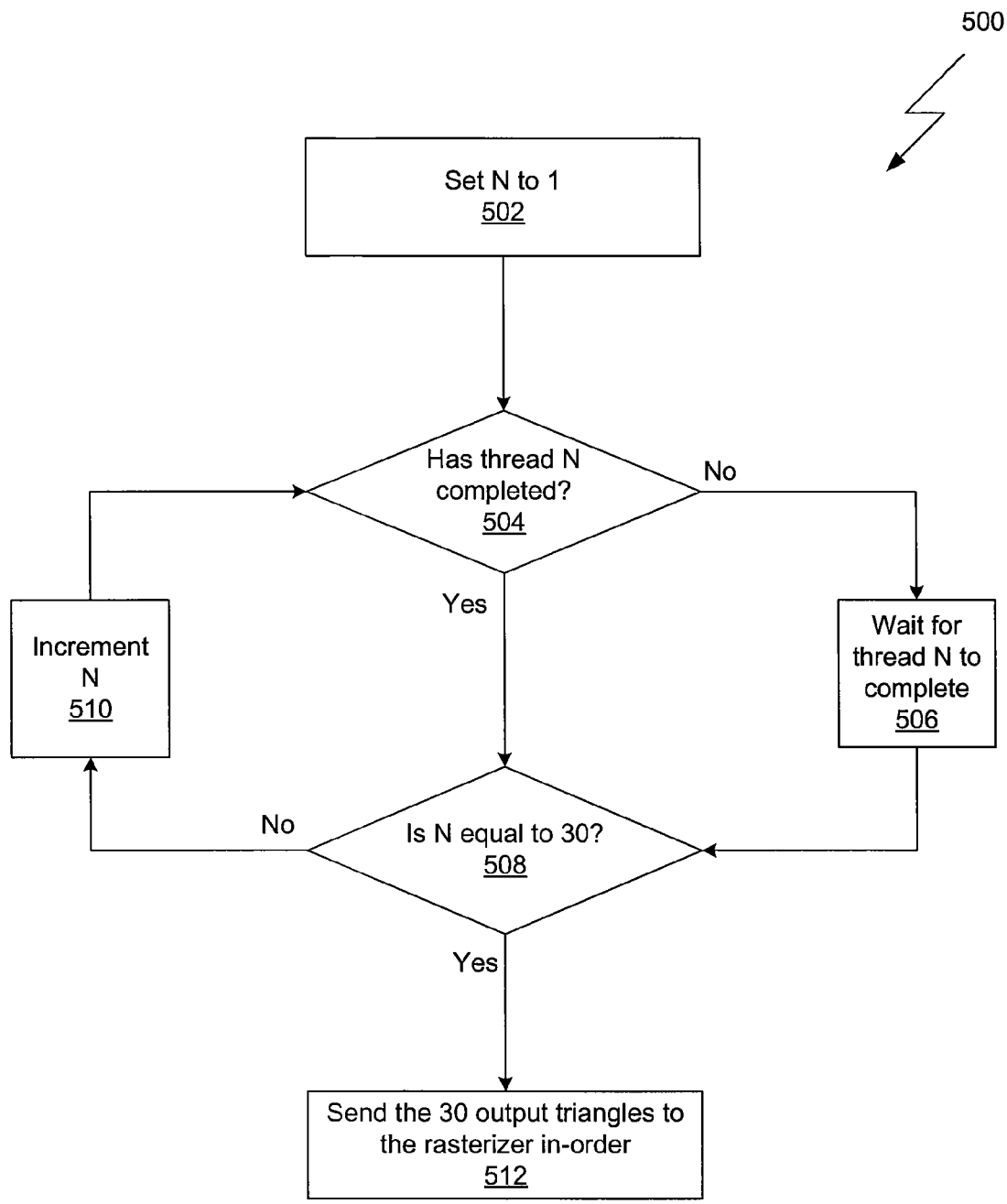
FIG. 5 is a flow diagram of method steps for managing the threads within the geometry shading engine of FIG. 3 as the input primitives are processed, according to one embodiment of the invention.

FIG. 5 is a flow diagram of method steps for managing the threads within the geometry shading engine 208 of FIG. 3 as the input triangles 304 are processed, according to one embodiment of the invention. Although the method steps are described in conjunction with the systems of FIGS. 1-3, persons skilled in the art will understand that any system that performs the method steps, in any order, is within the scope of the invention.

As shown, the method 500 begins at step 502, where logic within the GPU 118 sets a thread index N to 1 and the rasterizer 210 is set to an initial state to begin processing the primitives generated by the geometry shading engine 208. If, in step 504, logic within the GPU 118 determines that the execution thread N, in this case 1, spawned by the shading engine 208 has not completed, the method 500 proceeds to step 506, and logic within the GPU 188 waits for the execution thread N to complete. The method then continues at step 508, where logic within the GPU 118 compares the thread index N to the total number of threads launched within the geometry shading engine 208, here thirty, to determine whether all of the launched threads have completed. Since the method has, thus far, only determined that thread 1 has completed, the method proceeds to step 510 where logic within the GPU 118 increments the thread index N to 2.

The method continues in this fashion, looping through steps 504-510 a total of thirty times, thus ensuring that all thirty threads launched by the geometry shading engine 208 have completed. Ascertaining if a thread has completed in step 504 and waiting in step 506 may be accomplished in any technically feasible way. Once all of the launched threads have completed, in step 512, logic within the GPU 118 transmits the thirty output triangles 306 generated by the thirty threads to the rasterizer 210 in sequential order, thereby maintaining the order of the output triangles 306 within the overall graphics pipeline 200. Again, after the method 500 completes, the memory allocated in the on-chip buffers 130 for the output triangles 306 may be released and the geometry shading engine 208 may process the next five input triangles 304.

The overall latency of the geometry shading engine 208 includes both the time required to execute method 400 (where geometry shading is performed) and the time required to execute method 500 (where the output buffers are drained). If M cycles are required for a geometry shader 302 to process an input triangle 304 and store the resulting output triangle 306 in the output buffer, and each geometry shader 302 within the geometry shading engine 208 executes substantially in parallel, then the geometry shading engine 208 takes M cycles to process all of the input triangles 304. Furthermore, if D cycles are required to drain each output buffer, then 30*D cycles are required to drain the output buffers. Since, as described above, the output buffers drain serially to maintain the order of the output triangles 306 within the overall graphics pipeline 200. Thus, the overall latency of the geometry shading engine 208 is M+30*D cycles. Advantageously, this latency is approximately one-sixth the latency of a conventional geometry shading engine that is configured to process 32 input triangles and generate 192 output triangles.

Although embodiments of the present invention have been described in the context of geometry shading for cube-map rendering, persons skilled in the art will appreciate that the principles of the present invention are applicable to any algorithm where the work associated with processing a single input primitive may be allocated across two or more geometry shaders defining a geometry shader group.

In sum, improved utilization of graphics hardware may be achieved by explicitly expressing additional primitive-level parallelism using geometry shader groups. In one embodiment of the invention, a geometry shading algorithm is analyzed to determine whether the algorithm is amenable to distributing the processing of each input primitive across two or more geometry shaders defining a geometry shader group. In such cases, upon receiving an input primitive, logic within the geometry shading engine routes the input primitive to each of the geometry shaders in the geometry shader group, thereby causing the geometry shaders to execute in parallel. Each geometry shader launches a single execution thread to process the input primitive according to the specific portion of work the geometry shader has been programmed to perform. As each thread completes, the output primitive generated by the thread is stored in on-chip GPU memory.

Further parallel processing may be achieved if the geometry shading engine is configured as multiple parallel geometry shader groups where each shader group is responsible for processing one or more input primitives. After all of the geometry shader threads across the different geometry shader groups have completed, the output primitives are processed in sequential order by the rasterizer.

Advantageously, when a geometry shading engine is configured to include geometry shader groups instead of individual geometry shaders, the number of both input primitives and output primitives that are simultaneously stored in on-chip GPU memory is divided by the number of geometry shaders in the geometry shader group. Thus, the amount of on-chip GPU memory used by the geometry shading engine may be significantly reduced. Furthermore, since both the time required for the geometry shading engine to execute and the time required to sequentially drain the resulting output buffers are reduced, the latency of the geometry shading engine is also reduced. Yet another advantage is that, since the use of geometry shader groups reduces the number of output primitives emitted by each geometry shader, using geometry shader groups may avoid the output limit restriction of conventional geometry shaders. Consequently, embodiments of the present invention enable geometry shading engines to execute geometry shading algorithms that would be prohibited in prior art approaches.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for parallel geometry shading, the method comprising:

defining a geometry shader group that includes a plurality of geometry shaders, wherein each one of the geometry shaders resides within a processing unit, and an execution thread that is an instance of a geometry shading program executes on each one of the geometry shaders;

executing the geometry shading program such that the geometry shader group receives an input primitive; and transmitting an instance of the input primitive to each geometry shader in the geometry shader group for processing.

2. The method of claim 1, wherein each geometry shader in the geometry shader group produces one or more output primitives based on the input primitive.

3. The method of claim 1, wherein the geometry shader group includes six geometry shaders, the geometry shading group receives an input triangle, and each of the six geometry shaders produces one output triangle.

4. The method of claim 3, wherein geometry shading program is a cube mapping program, and each of the six output triangles corresponds to a different face of a cube.

5. The method of claim 1, wherein the steps of defining, executing and transmitting are performed for each of a plurality of geometry shader groups, each geometry shader group receiving a different input primitive.

6. The method of claim 5, wherein each geometry shader included in each geometry shader group produces one or more output primitives based on the input primitive received by the geometry shader group.

7. The method of claim 6, further comprising the step of storing the output primitives produced by the geometry shaders in one or more output buffers.

8. The method of claim 7, further comprising the step of transmitting the output primitives to a rasterizer in an order that reflects the order in which the input primitives were received by the geometry shader groups.

9. A non-transitory computer-readable medium, including instructions that, when executed by a processing unit, cause the processing unit to implement parallel geometry shading, by performing the steps of: defining a geometry shader group that includes a plurality of geometry shaders, wherein an execution thread that is an instance of a geometry shading program executes on each one of the geometry shaders; executing the geometry shading program such that the geometry shader group receives an input primitive; and transmitting an instance of the input primitive to each geometry shader in the geometry shader group for processing.

10. The non-transitory computer-readable medium of claim 9, wherein each geometry shader in the geometry shader group produces one or more output primitives based on the input primitive.

11. The non-transitory computer-readable medium of claim 9, wherein the geometry shader group includes six geometry shaders, the geometry shading group receives an input triangle, and each of the six geometry shaders produces one output triangle.

12. The non-transitory computer-readable medium of claim 11, wherein geometry shading program is a cube mapping program, and each of the six output triangles corresponds to a different face of a cube.

13. The non-transitory computer-readable medium of claim 9, wherein the steps of defining, executing and transmitting are performed for each of a plurality of geometry shader groups, each geometry shader group receiving a different input primitive.

14. The non-transitory computer-readable medium of claim 13, wherein each geometry shader included in each geometry shader group produces one or more output primitives based on the input primitive received by the geometry shader group.

15. The non-transitory computer-readable medium of claim 14, further comprising the step of storing the output primitives produced by the geometry shaders in one or more output buffers.

16. The non-transitory computer-readable medium of claim 15, further comprising the step of transmitting the output primitives to a rasterizer in an order that reflects the order in which the input primitives were received by the geometry shader groups.

17. A system configured to perform parallel geometry shading, the system comprising:
a memory; and
a processing unit that includes a geometry shading engine that includes:
a means for defining a geometry shader group that includes a plurality of geometry shaders, wherein an execution thread that is an instance of a geometry shading program executes on each one of the geometry shaders,
a means for executing the geometry shading program such that the geometry shader group receives an input primitive, and
a means for transmitting an instance of the input primitive to each geometry shader in the geometry shader group for processing.

18. The system of claim 17, wherein each geometry shader in the geometry shader group produces one or more output primitives based on the input primitive.

19. The system of claim 17, wherein the geometry shading engine further includes a means for defining a plurality of geometry shader groups, a means for executing the geometry shading program such that each geometry shader group receives a different input primitive, and a means for transmitting an instance of a given input primitive to each geometry shader included in the geometry shader group receiving the given input primitive.

20. The system of claim 19, wherein each geometry shader included in each geometry shader group produces one or more output primitives based on the input primitive received by the geometry shader group, and the output primitives are transmitted to a rasterizer in an order that reflects the order in which the input primitives were received by the geometry shader groups.

* * * * *